S J. CADY.
PHOTOGRAPHY EXPOSURE METER.
APPLICATION FILED OCT. 3, 1916.

1,262,635.

Patented Apr. 16, 1918.
2 SHEETS—SHEET 2.

Inventor
S. J. Cady.
By John Louis Waters
Attorney

UNITED STATES PATENT OFFICE.

SILAS J. CADY, OF DALLAS, TEXAS.

PHOTOGRAPHY EXPOSURE-METER.

1,262,635.  Specification of Letters Patent.  Patented Apr. 16, 1918.

Application filed October 3, 1916. Serial No. 123,538.

*To all whom it may concern:*

Be it known that I, SILAS J. CADY, a citizen of the United States, residing at Dallas, in the county of Dallas and State of Texas, have invented certain useful Improvements in Photography Exposure-Meters, of which the following is a specification, reference being had therein to the accompanying drawing.

The invention relates to an exposure meter, and more particularly to the class of adjustable exposure indicators for use in photography.

The primary object of the invention is the provision of a meter or indicator of this character wherein the correct exposures under all conditions may be obtained in the taking of pictures irrespective of the weather condition and the period of day, and at the same time enabling the user to determine with accuracy the period of exposure with regard to plates and films having predetermined speeds of sensitiveness.

Another object of the invention is the provision of a meter or indicator of this character wherein a plurality of dials are arranged in determined order and coöperate with each other so that indicia upon the dials will enable the user to determine with certainty the exposure to be made for the taking of subjects of variable characters and at different times of day so that accuracy in the exposure under all conditions can be had to assure the taking by amateurs of perfect pictures with a camera.

A further object of the invention is the provision of a meter or indicator of this character wherein the construction thereof is novel in form so that the same can be readily adjusted according to conditions at the time of the taking of a picture to assure accuracy as to the exposure of the plate or film with regard to the speed thereof.

A still further object of the invention is the provision of a meter or indicator of this character wherein each subject for a picture can be properly photographed in accordance with the character thereof, the time of day, the light condition, the nature of the speed of the plate or film, the time of the year and the location, so that the plate or film will be subjected to a perfect exposure with accuracy without regard to the user of the camera or operator thereof.

A still further object of the invention is the provision of a meter or indicator which is simple in construction, readily and easily operated, reliable and efficient in its purpose and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings.

Similar reference characters indicate corresponding parts throughout the several views of the drawings.

Figure 1:
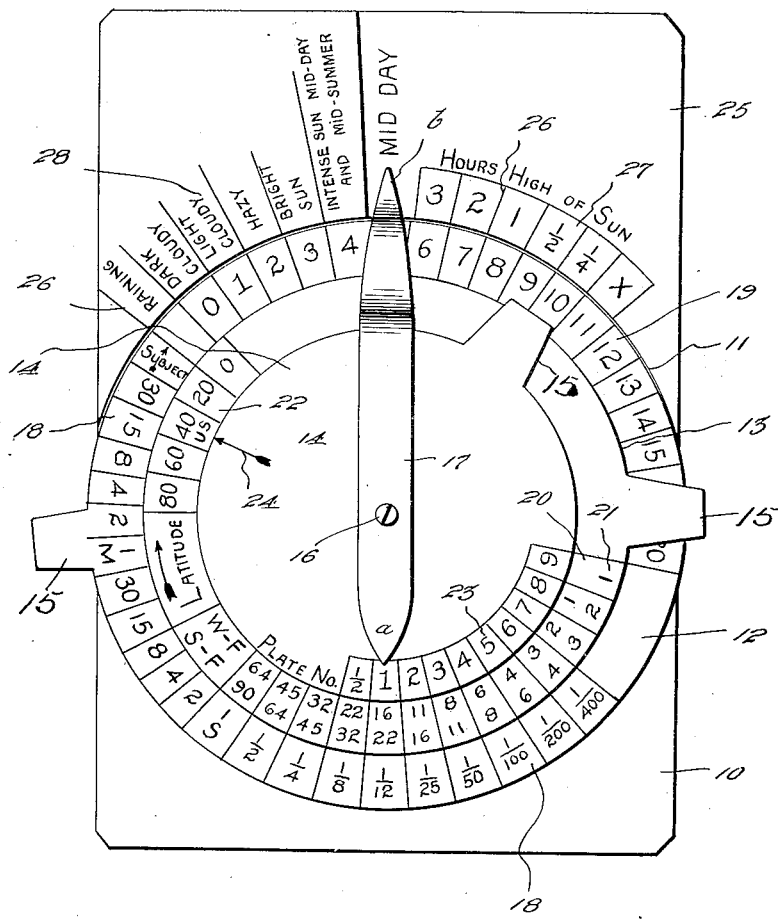
Figure 1 is a plan view of a meter or indicator constructed in accordance with the invention.
Figure 2:
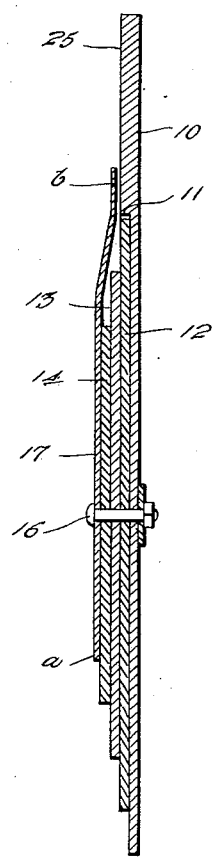
Fig. 2 is a vertical longitudinal sectional view thereof.
Figure 3:
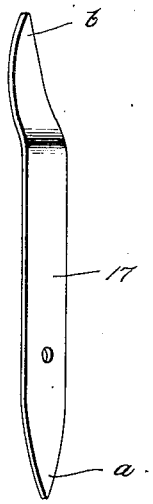
Fig. 3 is a perspective view of the pointer used with the meter or indicator.

Referring to the drawings in detail, the meter or indicator comprises a base 10 preferably made from cardboard, or any other suitable material, and is of rectangular shape, although it may be of any other desirable shape. The base has formed in the upper face thereof adjacent one end a recess 11 for receiving a dial 12 which is of a diameter to have its peripheral edge protrude a distance beyond opposite longer edges of the base 10 so that the dial 12 can be manually rotated in a convenient manner.

Superimposed upon the dial 12 are the dials 13 and 14 respectively, the latter being the outermost or upper dial, and is of less diameter than the other dial 13, which is the intermediate one, the latter being smaller than the dial 12, each dial being formed at its peripheral edge with a finger-hold or tab 15 which permits the manual rotation thereof when it is desired to turn any one of the dials 12, 13 and 14 for a purpose presently described. The dials 12, 13 and 14 have passed centrally therethrough a pivot 16 which is fastened in the center of the recess 11 in the base 10 in any suitable manner and constitutes the axis of rotation for the dials. Mounted upon the pivot 16 is an arm or finger 17 constituting pointers *a* and *b* respectively at opposite ends thereof for a purpose presently described.

The dial 12 on the upper face thereof marginally, for one-half of its circumference, is marked or otherwise provided with spaced radial division lines forming spaces 18 in which is arranged indicia indicative of seconds, minutes and fractions thereof to constitute a scale for determining the shutter speed of a camera, while the other half of the upper face of the dial 12, circumferentially and marginally thereof, is marked or otherwise provided with spaced radial division lines forming spaces 19 in which is arranged indicia indicative of a scale of numerals ranging from zero to twenty, representing subjects in photography, that is to say, each numeral of the scale is selected and represented in a table of subjects to enable one to determine at a glance a particular subject for the photographing thereof with accuracy of exposure of a film or plate within a camera in a manner presently described.

The dial 13 has marked or otherwise provided on its outer face, circumferentially and marginally thereof, the respective scales 20, 21 and 22, which are indicative, by numerals or other characters, of the periods or seasons in determined localities, that is to say, the scale 20, by the characters or letters "W. F.," is representative that this particular scale is indicative of time stops for the winter period, while the letters or characters "S. F." are representative with the scale 21 of the time stops for the summer period, and the scale 22 is representative of the degrees of latitude of a place or locality relative to the equator.

The dial 14 has marked or otherwise provided on its upper face for a distance circumferentially and marginally thereof, spaced radial division lines forming a scale 23, including indicia indicative of the speeds of photographic plates or films, while spaced from the scale 23 is an arrow mark 24 which is adapted to coöperate with the scale 22 so as to position the scale 23 in accordance therewith for determining the exposure of the plate or film according to the reading of the scales 21 and 22 upon the dial 13. The pointer end $a$ of the arm 17 is adapted to coöperate with the scale 23 for the positioning of the arm in accordance with the speed of the plate or film to be used in photography in the taking of a picture.

The upper surface 25 of the base 10 adjacent the curved edge of the recess 11 has marked or otherwise provided thereon spaced radial division lines 26, the spaces of which have arranged therein indicia indicative of two scales 27 and 28 respectively, the scale 27 being representative of the time of day while the scale 28 is representative of the light condition of the day, and coöperative with the scale 28 are the spaces 19 having the indicia indicative of subject of the picture to be taken, while coöperative with the scale 27 is the pointer end $b$ of the arm 17 so that on the adjustment of the dial according to the time of day, character of the subject, condition of the light, location of the subject as to place and the speed of the plate or film used for the taking of a picture of the subject, the photographer or operator of the camera can determine with accuracy the proper exposure of the film or plate for the taking of the picture.

It will be noticed that the arm 17 is held in frictional contact with the dial 14 by means of the fastening bolt 16 so that the dial and the arm may move in unison. By the same fastening means, the dial 14 is held down in frictional contact with the dial 13 so as to move in unison with this last named dial. However, the dial 13 can move relatively to the dial 12 and of course the dial 12 can also be revolved relatively to the base 10. The scale 27 is formed directly upon the base 10 at the right thereof and it is to be noted that this scale indicates time, not by means of a clock, but the hours high of the sun. When the middle dial 13 is moved it carries along with it the top dial 14 and the pointer or arm 17 by friction. The scales 20 and 21 coöperate with the shutter time scale 18 on the dial 12. The scale 22 on the disk or dial 13 represents the latitude only and coöperates with the arrow 24 on the upper dial 14, and is clearly illustrated in Fig. 1. The long end "$b$" of the pointer is never manually moved, but moves as a consequence of manual pressure applied upon either the dial 14 or the dial 13 and when the dial 13 is moved it is for the purpose of obtaining the time of day by hours high of the sun.

The disk 12 is moved to set a subject number opposite the proper light condition. The dial 13 is operated or rotated to set the long end of the pointer to hours high of the sun which is indicated midway from four hours a. m. to four hours p. m. This two ended pointer performs a double function. The short end "$a$" of this pointer is set to a determinate speed number where it remains until another brand of plates having another speed number is used. Now by moving the dial 13 which moves the dial 14 and the pointer 17 by friction the pointer is moved without disturbing the particular position which the short end "$a$" occupies so as to indicate the determinate plate speed number. For example, if it is desired to change the speed from one as shown in Fig. 1, the short end of the pointer is manually moved one space toward the right. This moves the long end "$b$" one space to the left which last named end must be set back to the mid-day indicating position also shown in Fig. 1, and that is the reason why it is necessary to turn the dial 14 so as to carry the long end of the pointer along with it back to its first-named position. Hence, the operator will find the shutter times indicated on scale 18 of dial 12 opposite the various stops indicated on scales 20 and 21 on dial 13.

It is of course understood that suitable instructions by way of marking, printing or otherwise providing on the back of the base 10 will enable the user of the meter or indicator to properly adjust the disks or dials for determining with accuracy an exposure under all conditions and the character of the subject.

From the foregoing description, taken in connection with the accompanying drawings, the construction and manner of use of the herein described meter or indicator will be readily apparent and, therefore, a more extended explanation has been omitted.

Having thus described my invention, I claim:

1. In a device of the kind described, in combination, a base plate, having an arcuate series of indications inscribed thereupon, a relatively large dial rotatable thereupon and having a circumferential series of indications inscribed thereupon coöperating with said first-named indications, a second dial of a lesser diameter than the first dial so as to expose the indications on the first dial, said second dial having peripheral indications coöperating with the indications on the first dial, a third dial smaller than the second dial rotatable with said second dial and having peripheral indications coöperating with the indications on the second dial, a common pivot securing all of said dials upon the base-plate, and a pointer arm pivoted eccentrically upon said pivot and having a long arm projecting so as to move opposite the first-named indications on the base-plate, while its shorter arm is adapted to move opposite the indications on the last-named dial.

2. In a device as described, in combination, a base-plate having opposite sets of indications inscribed thereon, a dial pivoted on said base plate and having circumferential series of indications thereon adapted to register with the indications on said base-plate, a second dial smaller than the first dial also pivoted on the base-plate and having an arcuate series of indications and movable relatively thereto so as to cause its indications to register with the indications on the first-named dial, a third dial smaller than the second dial and having a series of indications, said third dial being also pivoted upon the base-plate and adapted to move in unison with the second dial and having its indications registering with the indications of the second dial, and a pointer pivoted on said base plate so as to have a long arm and a short arm at opposite sides of its pivot, said pointer moving with the second dial so that its long arm may be positioned opposite one of the indications of the base-plate, said pointer being movable relatively to the third dial so that its short arm may be positioned opposite any of the indications on the third dial.

In testimony whereof I affix my signature.

SILAS J. CADY.